(12) United States Patent
Garg et al.

(10) Patent No.: US 12,586,355 B2
(45) Date of Patent: Mar. 24, 2026

(54) ROAD AND INFRASTRUCTURE ANALYSIS TOOL

(71) Applicant: NEC Laboratories America, Inc., Princeton, NJ (US)

(72) Inventors: Sparsh Garg, San Jose, CA (US); Samuel Schulter, New York, NY (US); Vijay Kumar Baikampady Gopalkrishna, Santa Clara, CA (US)

(73) Assignee: NEC Corporation, Tokyo (JP)

( * ) Notice: Subject to any disclaimer, the term of this patent is extended or adjusted under 35 U.S.C. 154(b) by 476 days.

(21) Appl. No.: 17/941,676

(22) Filed: Sep. 9, 2022

(65) Prior Publication Data

US 2023/0088335 A1 Mar. 23, 2023

Related U.S. Application Data

(60) Provisional application No. 63/309,015, filed on Feb. 11, 2022, provisional application No. 63/246,812, filed on Sep. 22, 2021.

(51) Int. Cl.
| | |
|---|---|
| *G06V 10/774* | (2022.01) |
| *G06T 7/00* | (2017.01) |
| *G06V 10/82* | (2022.01) |
| *G06V 20/56* | (2022.01) |

(Continued)

(52) U.S. Cl.
CPC .......... *G06V 10/774* (2022.01); *G06T 7/0002* (2013.01); *G06V 10/82* (2022.01); *G06V 20/58* (2022.01); *G06V 20/588* (2022.01); *G06V 20/70* (2022.01); *G06T 2207/20081* (2013.01);

(Continued)

(58) Field of Classification Search
CPC ...... G06V 10/774; G06V 10/82; G06V 20/58; G06V 20/588; G06V 20/70; G06T 7/0002; G06T 2207/20081; G06T 2207/20084; G06T 2207/30256; G06T 2207/30261; G06T 2207/10028
See application file for complete search history.

(56) References Cited

U.S. PATENT DOCUMENTS

| | | | | |
|---|---|---|---|---|
| 10,242,264 B1 * | 3/2019 | Ten | .......... | G06V 20/56 |
| 11,037,328 B1 * | 6/2021 | Marschner | .......... | G06T 7/74 |

(Continued)

OTHER PUBLICATIONS

Kim, D., Tsai, Y. H., Suh, Y., Faraki, M., Garg, S., Chandraker, M., & Han, B. (Feb. 22, 28). Learning Semantic Segmentation from Multiple Datasets with Label Shifts. arXiv preprint arXiv:2202. 14030.

(Continued)

*Primary Examiner* — Solomon G Bezuayehu
(74) *Attorney, Agent, or Firm* — Vincent Duffy; Joseph Kolodka

(57) ABSTRACT

Systems and methods is provided for road hazard analysis. The method includes obtaining sensor data of a road environment including a road and observable surroundings, and applying labels to the sensor data. The method further includes training a first neural network model to identify road hazards, training a second neural network model to identify faded lane markings, and training a third neural network model to identify overhanging trees and blocking foliage. The method further includes implementing the trained neural network models to detect road hazards in a real road setting.

20 Claims, 5 Drawing Sheets

(51) Int. Cl.
    *G06V 20/58*         (2022.01)
    *G06V 20/70*         (2022.01)

(52) U.S. Cl.
    CPC ............... *G06T 2207/20084* (2013.01); *G06T 2207/30256* (2013.01); *G06T 2207/30261* (2013.01)

(56) References Cited

U.S. PATENT DOCUMENTS

| | | | | |
|---|---|---|---|---|
| 2005/0065711 | A1* | 3/2005 | Dahlgren | G08G 1/096775 701/117 |
| 2006/0239509 | A1* | 10/2006 | Saito | G06V 10/753 701/1 |
| 2015/0193988 | A1* | 7/2015 | Jenkins | G09B 29/106 701/31.5 |
| 2015/0269438 | A1* | 9/2015 | Samarasekera | G06F 18/24 382/154 |
| 2019/0147331 | A1* | 5/2019 | Arditi | G06N 3/08 706/20 |
| 2019/0161080 | A1* | 5/2019 | Gochev | G08G 1/165 |
| 2019/0243371 | A1* | 8/2019 | Nister | B60W 30/095 |
| 2019/0302761 | A1* | 10/2019 | Huang | G02B 27/017 |
| 2020/0066034 | A1* | 2/2020 | Tham | G01C 15/00 |
| 2020/0209864 | A1* | 7/2020 | Chen | G01C 21/3811 |
| 2020/0346621 | A1* | 11/2020 | Whikehart | B60S 1/0862 |
| 2021/0117694 | A1* | 4/2021 | Luk-Zilberman | B60K 35/28 |
| 2021/0141551 | A1* | 5/2021 | Johnson | G06F 3/0673 |
| 2021/0380126 | A1* | 12/2021 | Liu | G06N 5/02 |
| 2021/0406262 | A1* | 12/2021 | Unnikrishnan | G06F 16/2462 |
| 2022/0076129 | A1* | 3/2022 | Kasioumis | G06N 3/0464 |
| 2022/0156525 | A1* | 5/2022 | Guizilini | G06N 3/0464 |
| 2022/0317301 | A1* | 10/2022 | Stenson | G06V 10/145 |
| 2022/0318450 | A1* | 10/2022 | Stenson | G06F 30/20 |
| 2022/0333950 | A1* | 10/2022 | Akbarzadeh | G01C 21/3804 |
| 2024/0395026 | A1* | 11/2024 | Staszel | B60W 30/09 |

OTHER PUBLICATIONS

Ranftl, R., Lasinger, K., Hafner, D., Schindler, K., & Koltun, V. (Aug. 27, 2020). Towards robust monocular depth estimation: Mixing datasets for zero-shot cross-dataset transfer. IEEE transactions on pattern analysis and machine intelligence.

* cited by examiner

210    RECEIVE DATA SET(S)

220    APPLY LABELS FOR KNOWN CONDITIONS

230    TRAIN AND GENERALIZE THE SEGMENTATION MODEL

240    OUTPUT TRAINED MODEL(S)

310 — RECEIVE DATA SET(S)

320 — SEMANTIC MAP

325 — UNIVERSAL SEGMENTATION 332      330 — ANNOTATOR      336      338

CATALOG      ROAD MAP      TREE MAP      LIST OF RUTS 342      334      340      336

TRAINED MODELS

RUT AND CRACK DETECTOR      LANE MARKING DETECTOR      FOLIAGE DETECTOR

344

350 — PREDICTING MAINTENANCE

510  OBTAIN SENSOR DATA

520  APPLY LABELS TOSENSOR DATA

530  TRAIN FIRST, SECOND, AND THIRD MODELS

540  IMPLEMENT THE TRAINED MODELS

ROAD AND INFRASTRUCTURE ANALYSIS TOOL

RELATED APPLICATION INFORMATION

This application claims priority to U.S. Provisional Application No. 63/246,812, filed on Sep. 22, 2021, and U.S. Provisional Application No. 63/309,015, filed on Feb. 11, 2022, both incorporated herein by reference in its entirety.

BACKGROUND

Technical Field

The present invention relates to artificial intelligence based analysis of road and infrastructure conditions, and more particularly to a neural network road and infrastructure analysis tool.

Description of the Related Art

Roads and infrastructure can suffer from wear and environmental damage. Ruts and potholes can appear in roadways, and infrastructure can suffer from corrosion and rot depending on the materials used. Trees and foliage can block signs and threaten to fall across roads and powerlines. Such damaged roads and infrastructure may need to be identified and scheduled for maintenance.

SUMMARY

According to an aspect of the present invention, a method is provided for road hazard analysis. The method includes obtaining sensor data of a road environment including a road and observable surroundings, and applying labels to the sensor data. The method further includes training a first neural network model to identify road hazards, training a second neural network model to identify faded lane markings, and training a third neural network model to identify overhanging trees and blocking foliage. The method further includes implementing the trained neural network models to detect road hazards in a real road setting.

According to another aspect of the present invention, a system is provided for road hazard analysis. The system includes one or more processors, memory coupled to the one or more processors through a bus, and communication hardware coupled to the one or more processors and memory. The system further includes a first neural network model trained to identify road hazards, a second neural network model trained to identify faded lane markings, and a third neural network model trained to identify overhanging trees and blocking foliage, stored in the memory.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with embodiments of the present invention, systems and methods are provided to/for training a neural network to identify conditions of roads and infrastructure that may require maintenance. Ruts and cracks in roadways, faded lane markings, and overhanging trees and blocking foliage can be identified and maintenance instructions communicated for corrective actions to work crews.

In one embodiment, a road and infrastructure analysis tool can measure 3D sizes and localize positions on a map to detect road attributes. The road and infrastructure analysis tool can detect sidewalks, road lanes, crosswalks, street signs, street lights, trees, bridges, etc. The road and infrastructure analysis tool can detect and identify road conditions that may need maintenance or otherwise require attention, for example, potholes, cracks, ruts, faded road markings, etc. The road and infrastructure analysis tool can also detect infrastructure deterioration, for example, corrosion, rot, crumbling cement, etc. using trained neural networks.

In various embodiments, the road and infrastructure analysis tool can identify positions and/or areas on a map, measure the size, and specify the kind of attention or maintenance that may be needed.

It is to be understood that aspects of the present invention will be described in terms of a given illustrative architecture; however, other architectures, structures, components and process features and steps can be varied within the scope of aspects of the present invention.

Figure 1:
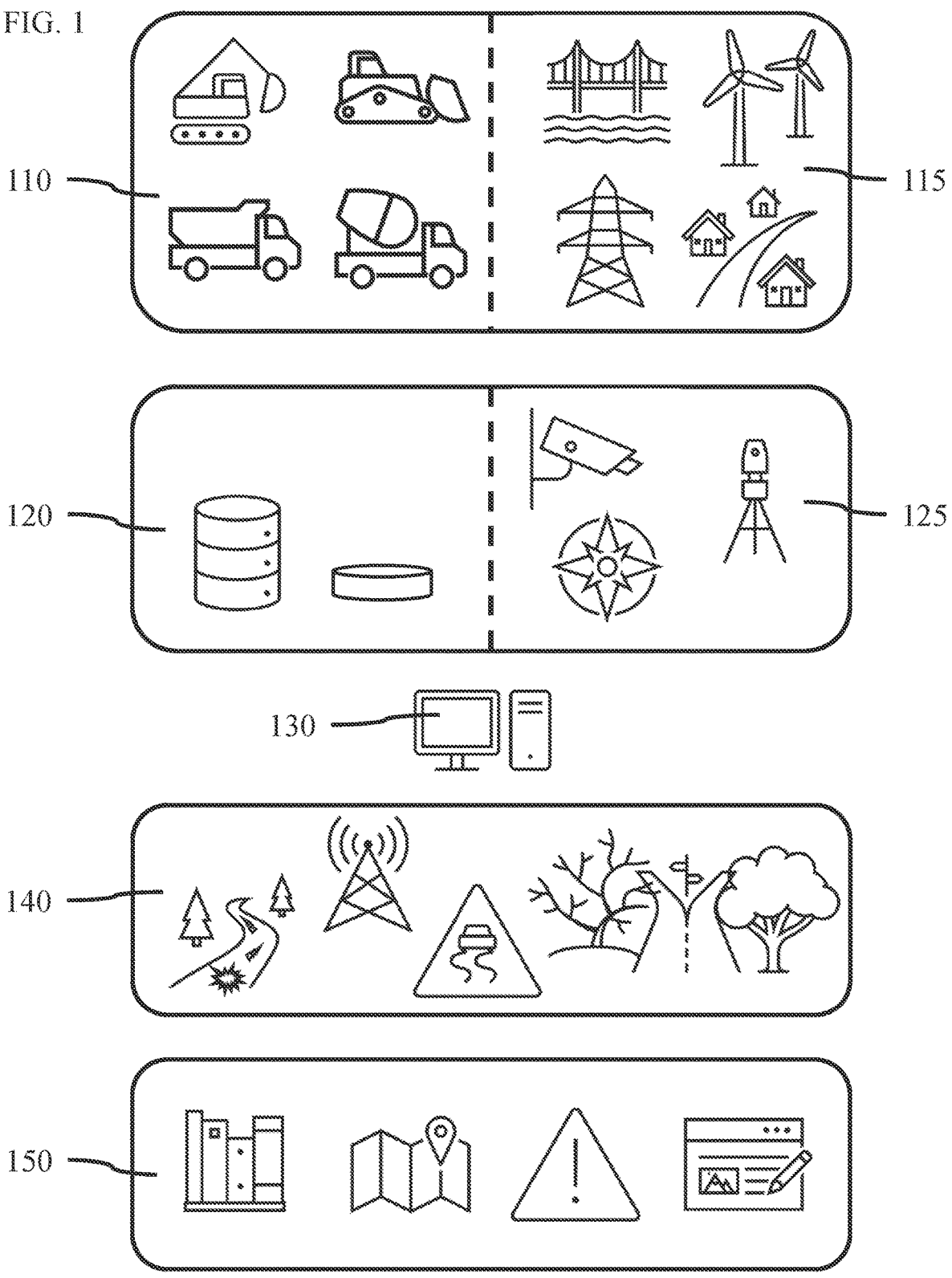
FIG. 1 is a block/flow diagram illustrating a high-level system/method for rut and crack detection, in accordance with an embodiment of the present invention.

Referring now in detail to the figures in which like numerals represent the same or similar elements and initially to FIG. 1, a high-level system/method for identifying more specific problems in the road like ruts, cracks, faded lanes, foliage, etc. with minimal human annotation efforts and able to achieve the accuracy of over 90% on unseen datasets is illustratively depicted in accordance with one embodiment of the present invention.

In one embodiment, a universal representation learning (UR-learning) approach is used to detect the road attributes and creating the pseudo labels which helps to train the model for identifying required maintenance areas of roads with just 1000 images of new annotations. We were able to reduce human annotation time from 6 months to a week, where UR-learning and a depth model are used to measure the road attributes in 3D, and localizing it on the map. UR-Learning is able to achieve domain generalization for semantic segmentation in new scenarios, with unlabeled or limited labeled data.

At block 110 utility and construction vehicles can be outfitted with a variety of sensors to detect the road environment and location, where the road environment includes a road and the observable surroundings around the road.

At block 115, the sensors can be used to obtain data about infrastructure and infrastructure environments to identify the features to be analyzed. The sensor data can be obtained from vehicles mounting different types of sensors.

At block 120, the images and data sets collected by the sensors can be labeled or remain unlabeled.

At block 125 digital cameras, Lidar, global positioning system (GPS), and motion sensors can be used to generate data about the surrounding road environment, where these sensors can be mounted on the utility and construction vehicles. The digital camera can collect digital images. The Lidar can collect point cloud data sets for 3 dimensional rendering. The motion sensor can detect the direction of travel and the vertical motion over ruts and crack that can indicate depth, as digital data sets. The GPS can be used to identify the location of the hazards and road features.

At block 130, the various data sets can be fed into the analysis tool to identify the different hazards. The road hazard analysis tool can be a set of trained neural networks, which can be convolutional neural networks, that can identify each of a catalogs set of different road hazards. In various embodiments, there can be three neural networks, where each neural network is trained to identify a different type of road hazard from the sensor data. A first neural network model can be trained to identify road hazards. A second neural network model can be trained to identify faded lane markings. A third neural network model can be trained to identify overhanging trees and blocking foliage. The road hazard analysis system can be configured to communicate maintenance instructions generated from the identified road hazards for corrective actions to one or more work crews to address the identified road hazards through communication hardware.

At block 140, the road features and hazards can be identified by the neural network models and cataloged, including for example, potholes, fixed structures, road attributes, road signs, and foliage.

At block 150, the features can be saved in a database catalog, identified on a map, hazards identified, and maintenance instructions provided to road work crews.

Unlike doing supervised learning, the UR-learning approach which is pretrained on various open datasets to generate semantic maps and decided to use semi-supervised learning with just 1000 new annotations can be used for ruts and cracks. A resnet101 architecture can be used to train the system to detect the ruts and cracks in the road scenes.

We also gathered 500 annotations for the faded lanes and divided the image into the chunks and filtered out the squared chunks where the lanes exist and utilized resnet18 to do the binary classification and then recombine all the chunks to recreate an image. We are also covering the foliage which identifies if tree branch needs to be trimmed, we are using MiDaS to predict the depth maps and converting depth maps to point clouds in 3d and calculating the percentage of tree branches over the road.

A catalog for road infrastructure can be created that lists all of the types of road features and attributes to be checked for.

This approach is not only specialized to specific types of detects, it can be utilized to detect other future defects as well.

Figure 2:
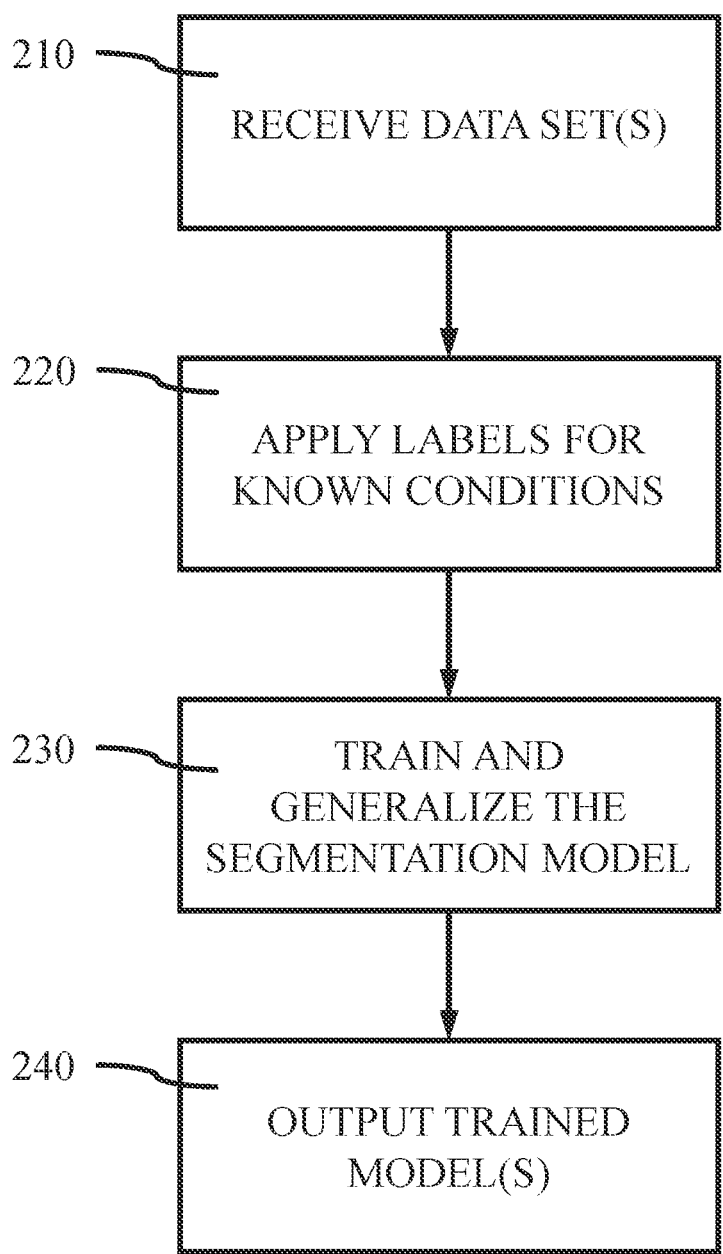
FIG. 2 is a block/flow diagram illustrating a system/method for labeling and training a rut and crack detection, in accordance with an embodiment of the present invention.

FIG. 2 is a block/flow diagram of a system/method for training the analysis neural network models, in accordance with an embodiment of the invention.

At block 210, the data can be received by the training system.

First step, is to obtain the semantic maps from the given image as an input, We achieve this by running Universal Segmentation model which gives pixel wise segmentation results of road scenes to detect sidewalks, crosswalks, lanes, signs, streetlights, bridges, trees, snow, roads etc. to get the catalog for road infrastructure.

At block 220, labels can be applied to a limited number of known conditions appearing in the data, for example, soft labels can be applied to the digital images.

Further, we have annotated 1000 images for ruts/cracks over pseudo labels, we train the model by combining supervised and weak supervised approach to detect the ruts and cracks in a given image.

At block 230, the labeled data sets can be fed into different neural networks to train for identify different road features and hazards. One model may be trained to identify road damage like ruts, cracks, and potholes. Another model may be trained to identify faded road markings like lane lines and crosswalks, Another model may be trained to identify trees and foliage and the use of 3D point clouds to identify positioning of the tress over roadways.

At block 240, the trained models can be provided to perform road analysis on new terrain.

Figure 3:
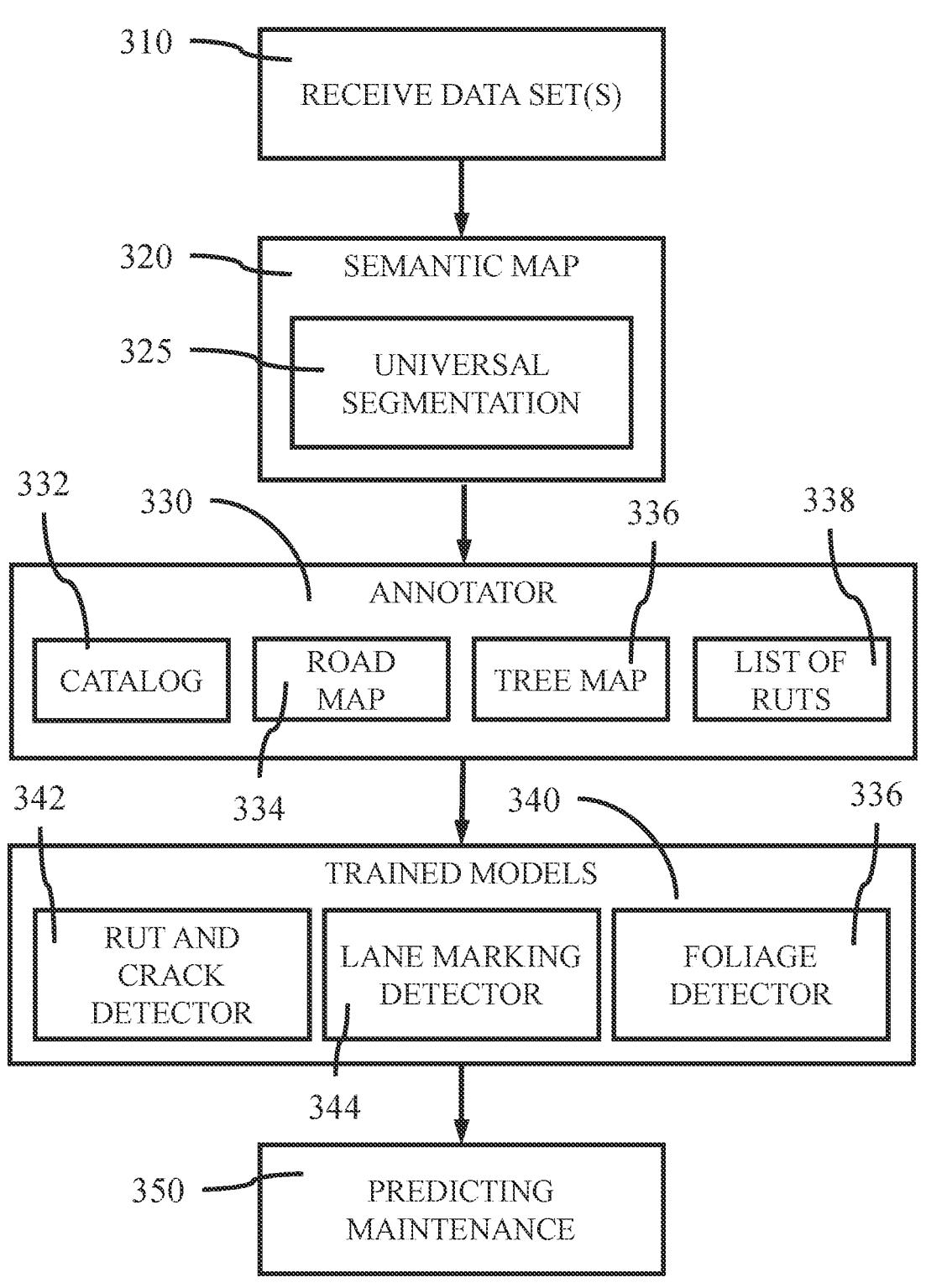
FIG. 3 is a flow diagram illustrating a system/method for identifying hazards and predicting maintenance, in accordance with an embodiment of the present invention.

FIG. 3 is a block/flow diagram of a system/method for performing road analysis using the trained neural network models, in accordance with an embodiment of the invention.

At block 310, new data, not used for training, is obtained for terrain and road environments using the vehicle mounted sensors.

At block 320, the sensor data can be converted into a semantic map. It generates the semantic maps of around 70 categories includes road scene attributes and other categories which act as an input to train models for rut/cracks, faded lanes and foliage detection. The semantic maps can apply soft labels to digital images to be used for training.

At block 325, the semantic map can be automatically labeled using universal segmentation to apply soft labels. On the output of universal segmentation 325, we annotate 1000 images for ruts and cracks and 500 images for faded lanes which act as ground truth to train the models.

At block 330, an annotator can store the labeled data sets as a catalog of road and infrastructure features. A road map can be generated using to GPS data to identify the positions and location of the catalog features, so a road crew will know where to go.

At block 340, roadway analysis is conducted using the trained models.

At block 342, we used resnet101 architecture as a backbone to train a deeplabv3 model to predict the probabilities of sky, building, road, car, lanes, ruts and cracks and take a threshold to get the image level classification of Ruts/Cracks. At train time, we provide the ruts and cracks information. At test time, we just provide an image of a road scene.

At block 344, we divided the input into multiple chunks of size (128,128) and filtered in the chunks which have pixels of lanes and then train a binary classifier using resnet18 architecture to predict the chunk having faded and fine lanes.

At block 346, we used MiDaS depth model to get the depth of the rgb image and further we converted the depth map to point-cloud and filtered in the points correspond to trees and road and then we calculate the percentage of tree points on the road which shows the foliage on the road.

Apart from it, to get the foliage information, we run the MiDaS depth model to get the depth map and it gets converted into point-cloud, using the semantic map information of trees and road, points get filtered out and % age of trees over the road is calculated.

At block 350, we blend all the results from the above detectors and overlayed the predicted portion of ruts, cracks, faded and fine lanes and plot the top view map of trees and road points to show the foliage detection.

In parallel, pseudo labels are divided into a chunks and we train the faded lane binary classification model where the chunk size is (128,128).

The above generated outputs are passed to an image blender where all the areas which needs road maintenance along with road catalog infrastructure can be seen.

Figure 4:
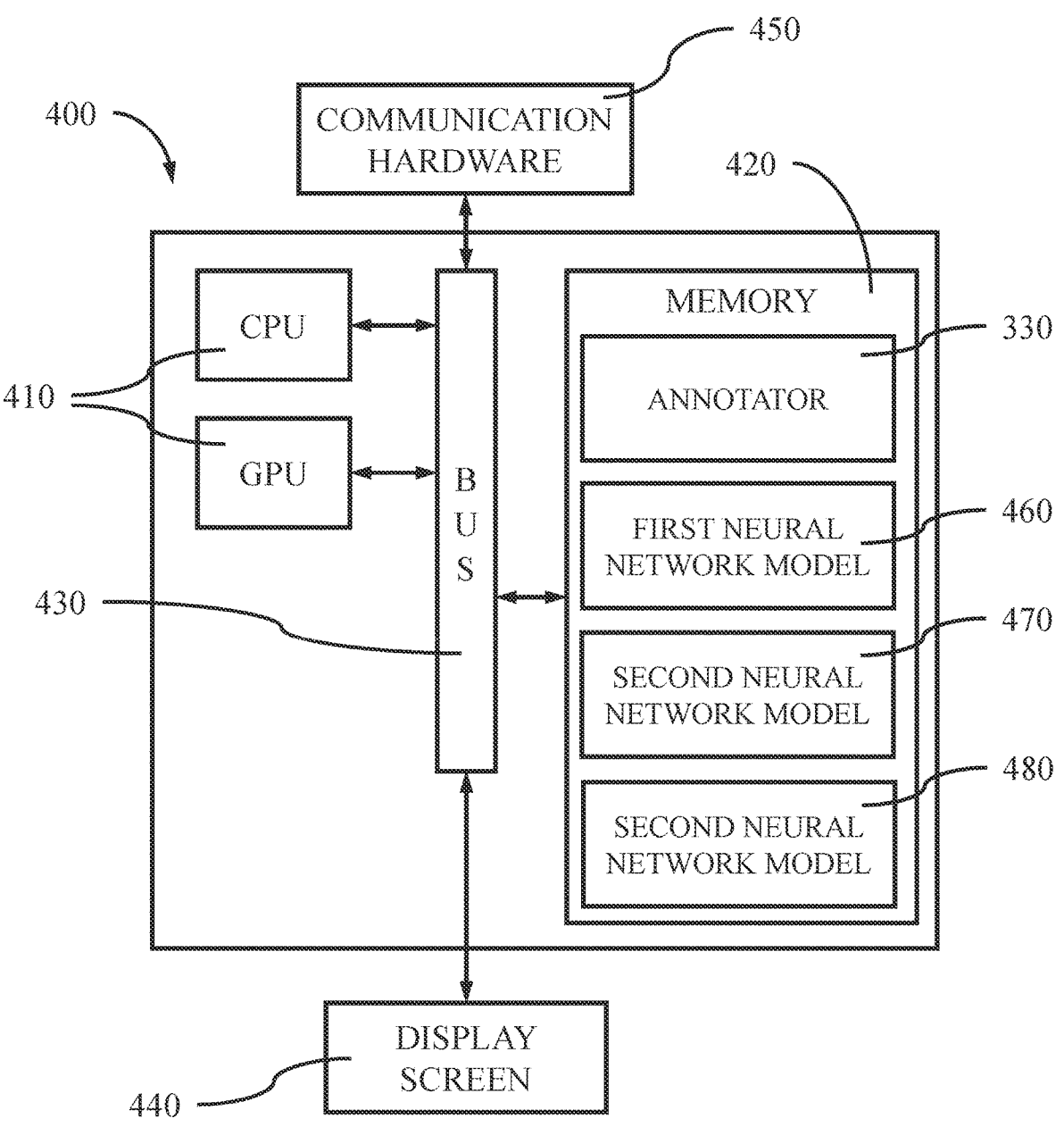
FIG. 4 shows a computer system for road hazard analysis, in accordance with an embodiment of the present invention.

Referring now to FIG. 4, FIG. 4 shows a computer system for road hazard analysis, in accordance with an embodiment of the present invention.

In one or more embodiments, a computer system 400 for road hazard analysis can include one or more processors 410, for example, central processing units (CPUs), graphics processing units (GPUs), and combinations thereof, electrically coupled to a memory 420, for example, hard disk drives (HDDs), solid state drives (SSDs), random access memory (RAM), and combinations thereof, through a bus 430. In various embodiments, the computer system 400 can be configured to perform model training, 3D semantic segmentation, road hazard analysis. The output of the system 400 can be presented to a user on a display screen 440 electrically coupled to the system bus 430, or communicated to other individuals, for example, work crews, through communications hardware 450. Digital images, Lidar point cloud sets, and GPS location data can be input to the system 400 for road hazard analysis. The computer system 400 can be configured to be trained and perform the features described in the application and FIGS. 1-3.

In one or more embodiments, the system 400 for road hazard analysis can include an annotator 330 for generating pseudo-labels, a hazard catalog, road map(s), tree map(s), and a list of ruts, which can be stored in the memory 430. A first neural network 460, second neural network 470, and third neural network 480, which can be convolutional neural networks, can be stored in the memory 430 to be trained for and perform the road hazard analysis.

In one or more embodiments, the computer system 400 can include receive sensor data through the communication hardware 450 for road hazard analysis, where the sensor data can include digital images, Lidar point cloud sets, and GPS location data.

The computer system 400 can communicate maintenance instructions for corrective actions to one or more work crews to address the identified road hazards using the communication hardware 450.

Figure 5:
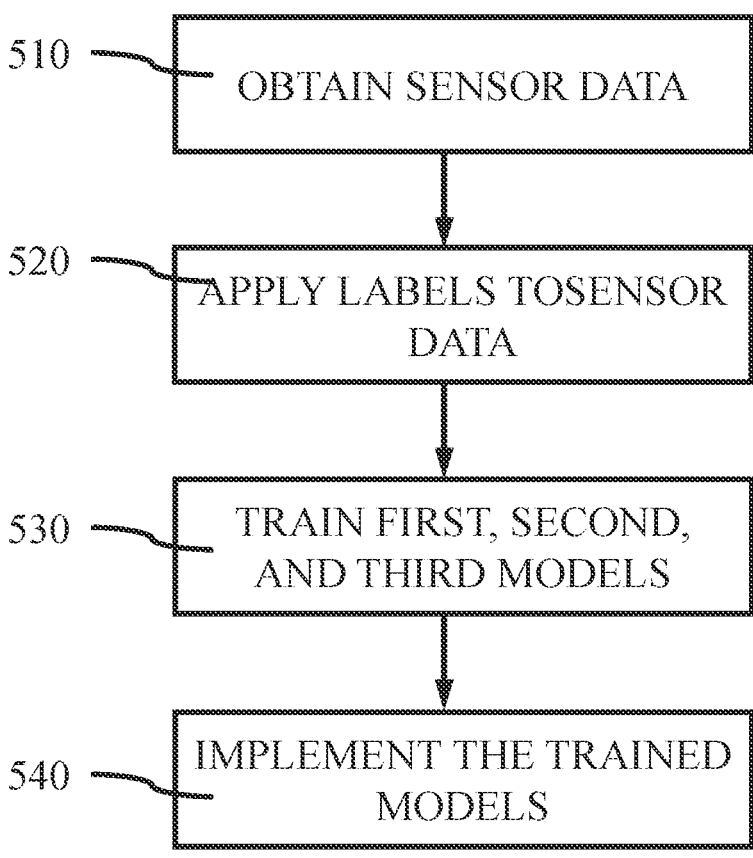
FIG. 5 is a block/flow diagram illustrating a system/method for identifying hazards and predicting maintenance, in accordance with an embodiment of the present invention.

FIG. 5 is a block/flow diagram illustrating a system/method for identifying hazards and predicting maintenance, in accordance with an embodiment of the present invention.

At block 510, sensor data of a road environment including a road and observable surroundings is obtained.

At block 520, pseudo-labels are applied to the sensor data.

At block 530, a first neural network model is trained to identify road hazards, a second neural network model is trained to identify faded lane markings, and a third neural network model is trained to identify overhanging trees and blocking foliage.

At block 540, the trained neural network models are implemented to detect road hazards in a real road setting.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for road hazard analysis, comprising:
obtaining sensor data of a road environment including a road and observable surroundings;
transforming, using a universal representation learning model, the sensor data into semantic maps by applying pseudo labels of road scene categories, generated through semantic segmentation of the road scene categories, to a road scene image obtained from the sensor data including:
training a first neural network model to identify road hazards with the semantic maps;
training a second neural network model to identify faded lane markings with the semantic maps;
training a third neural network model to identify overhanging trees and blocking foliage with the semantic maps by determining a percentage of trees over the road based on filtered points from point clouds converted from generated depth maps by a depth model based on the semantic maps;
generating, with the first, second, and third neural network models, a top-view road map having overlays of identified road hazards and maintenance instructions for the identified road hazards in a real world setting; and
communicating, through communications hardware, the top-view road map to one or more work crews.

2. The method as recited in claim 1, further comprising communicating maintenance instructions for corrective actions to one or more work crews to address the identified road hazards.

3. The method as recited in claim 2, wherein the first neural network model, second neural network model, and third neural network model have convolutional neural network (CNN) architectures.

4. The method as recited in claim 3, further comprising generating the top-view road map that identifies a location and a position of the identified road hazards with global positioning system (GPS) data, and communicating the road map to the one or more work crews.

5. The method as recited in claim 4, wherein the sensor data is obtained from sensors selected from the group consisting of digital cameras, lidar, global positioning systems, motion sensors, and combinations thereof.

6. The method as recited in claim 1, further comprising reducing annotation of road scene categories for road and infrastructure analysis by utilizing the first, second, and third neural network models to identify the road scene categories on a road scene.

7. The method as recited in claim 6, further comprising generating a road hazard catalog that identifies different types of road hazards trained for and detected.

8. The method as recited in claim 7, wherein the third neural network model is trained using lidar sensor data to determine a 3-dimensional position of tree limbs relative to the road.

9. The method as recited in claim 8, further comprising generating a tree map that identifies a location of trees that present identified hazards.

10. The method as recited in claim 9, further comprising identifying the location of faded lane markings that require repainting, and communicating the faded lane marking locations to the one or more work crews.

11. A system for road hazard analysis, comprising:
one or more processors;
memory coupled to the one or more processors through a bus; and
communication hardware coupled to the one or more processors and memory,
wherein the memory operates with the one or more processors and the communication hardware to perform:
obtaining sensor data of a road environment including a road and observable surroundings;

transforming, using a universal representation learning model, the sensor data into semantic maps by applying pseudo labels of road scene categories, generated through semantic segmentation of the road scene categories, to a road scene image obtained from the sensor data;

training a first neural network model to identify road hazards with the semantic maps;

training a second neural network model to identify faded lane markings with the semantic maps;

training a third neural network model to identify overhanging trees and blocking foliage with the semantic maps by determining a percentage of trees over the road based on filtered points from point clouds converted from generated depth maps by a depth model based on the semantic maps;

generating, with the first, second, and third neural network models, a top-view road map having overlays of identified road hazards and maintenance instructions for the identified road hazards in a real world setting; and communicating, through communications hardware, the top-view road map to one or more work crews.

12. The system as recited in claim 11, wherein the first neural network model, second neural network model, and third neural network model have convolutional neural network (CNN) architectures.

13. The system as recited in claim 12, further comprising an annotator that generates the top-view road map that identifies a location and a position of the identified road hazards with global positioning system (GPS) data, wherein the road map is communicated to the one or more work crews.

14. The system as recited in claim 13, further comprising one or more sensors selected from the group consisting of digital cameras, lidar, global positioning systems, motion sensors, and combinations thereof, wherein the sensor data is obtained from the one or more sensors mounted on vehicles.

15. The system as recited in claim 14, reducing annotation of road scene categories for road and infrastructure analysis by utilizing the first, second, and third neural network models to identify the road scene categories on a road scene.

16. The system as recited in claim 15, wherein the annotator generates a road hazard catalog that identifies different types of road hazards trained for and detected.

17. The system as recited in claim 16, wherein the third neural network model is trained using lidar sensor data to determine a 3-dimensional position of tree limbs relative to the road.

18. The system as recited in claim 17, wherein the annotator generates a tree map that identifies the location of trees that present identified hazards.

19. The system as recited in claim 18, wherein the system for road hazard analysis is configured to communicate the faded lane marking locations identified by the second neural network model to the one or more work crews using the communication hardware.

20. The system as recited in claim 19, wherein the road hazard analysis system is further configured to communicate maintenance instructions for corrective actions to one or more work crews to address the identified road hazards using the communication hardware.

* * * * *